United States Patent [19]

Baxter et al.

[11] 4,158,227

[45] Jun. 12, 1979

[54] PAGED MEMORY MAPPING WITH ELIMINATION OF RECURRENT DECODING

[75] Inventors: William D. Baxter, Seymour; Robert L. Metz, Nichols, both of Conn.

[73] Assignee: Bunker Ramo Corporation, Oak Brook, Ill.

[21] Appl. No.: 841,277

[22] Filed: Oct. 12, 1977

[51] Int. Cl.² ............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,368,207 | 2/1968 | Beausoleil et al. | 364/200 |
| 3,737,870 | 6/1973 | Carter et al. | 364/200 |
| 3,740,722 | 6/1973 | Greenberg et al. | 364/200 |
| 3,781,826 | 12/1973 | Beausoleil | 364/200 |
| 3,786,436 | 1/1974 | Zelinski et al. | 364/200 |
| 3,793,631 | 2/1974 | Silverstein et al. | 364/200 |
| 3,796,996 | 3/1974 | Curley et al. | 364/200 |
| 3,949,375 | 4/1976 | Ciarld | 364/200 |
| 3,967,251 | 6/1976 | Levine | 364/200 |
| 3,972,025 | 7/1976 | Taddei | 364/200 |
| 4,055,851 | 10/1977 | Jenkins et al. | 364/900 |
| 4,057,846 | 11/1977 | Cockerill et al. | 364/200 |
| 4,075,691 | 2/1978 | Davis et al. | 364/200 |
| 4,122,520 | 10/1978 | Adamchick et al. | 364/200 |

*Primary Examiner*—Gareth D. Shaw
*Assistant Examiner*—Michael C. Sachs
*Attorney, Agent, or Firm*—F. M. Arbuckle; Morris Liss

[57] ABSTRACT

A memory expansion apparatus is disclosed which provides for expansion of memory capacity by use of logic associated with memory modules. The logic provides for selection of one of a plurality of pages, each having substantially the same address therefor. The device provides for the selection by utilization of a special instruction, and includes decoding means for specialized bits in the instruction. Means are provided wherein repeated access to the same page in a block occurs free of a requirement of repeated address decoding amongst the plurality of pages in the block.

12 Claims, 5 Drawing Figures

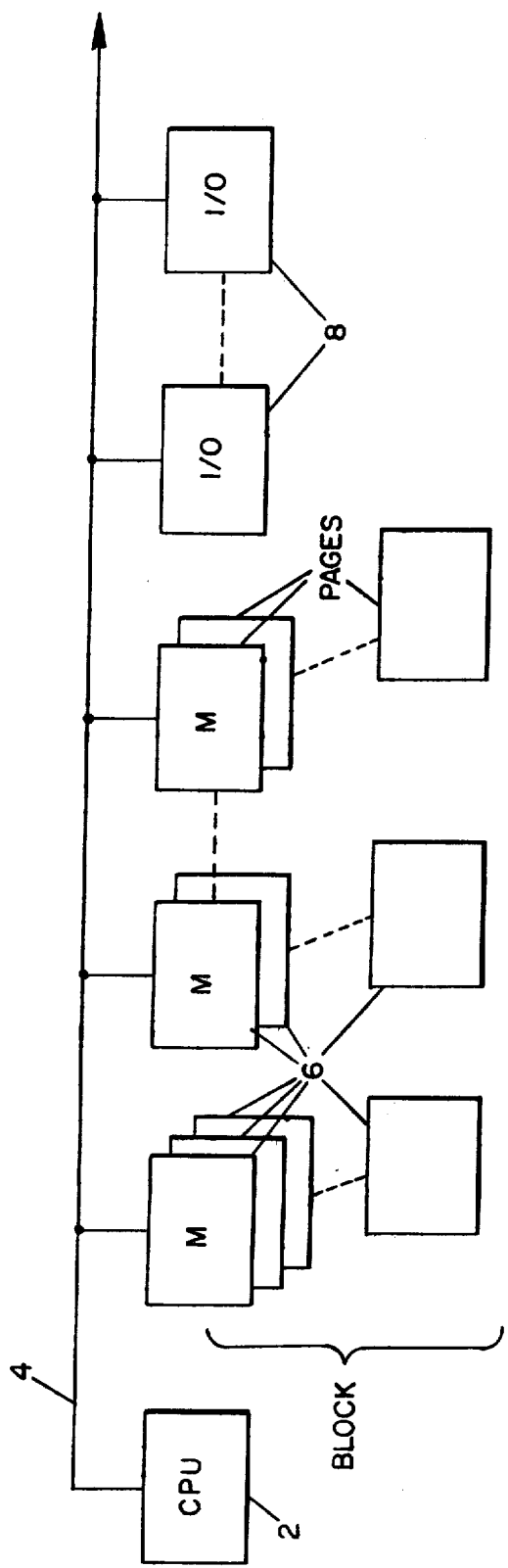

PAGED MEMORY MAPPING WITH ELIMINATION OF RECURRENT DECODING

BACKGROUND OF THE INVENTION

1. Field of the Invention

The present invention relates to memory expansion devices. More particularly, memory expansion apparatus requiring a minimum of logic circuitry and responding to execution of a particular function code is contemplated.

2. Brief Description of the Prior Art

Typical prior art devices for memory expansion are found in Gnadeberg et al U.S. Pat. No. 3,984,818, Taddei Pat. No. 3,972,025 and Elward U.S. Pat. No. 3,970,999. The prior art devices require the repeated decoding of the paging address scheme, as in Elward, for example, and require use of substantial and complicated logic circuitry.

SUMMARY OF THE INVENTION

The present invention overcomes the problems in the prior art and provides for a paging system for memory expansion which does not require repeated decoding, nor the hardware use therefor. Unlike the prior art, the present invention does not require a storage register or the repeated translation and decoding of the paging system. Rather, a single bit is set upon recognition of a specific page being selected, the bit remaining set until a different page is subsequently selected. Accordingly, the repeated decoding, involving fixed hardware as well as additional time useage, is minimized. Specifically, logic is provided for use with each memory module. The additional logic used with each module receives signals from a CPU or an I/O device acting in a direct memory access (DMA) mode, and, responsive thereto, outputs a particular control signal. The control signal is set to a high level if the particular module associated with the logic was addressed, and remains low if the module was not addressed. For subsequent addresses, the control signal remains high, thereby avoiding the requirement for constant decoding, repeated addressing, or storing the memory expansion code.

It is accordingly an object of the present invention to overcome the deficiencies of the prior art.

An additional object is to provide memory expansion by utilization of a distributed logic network.

It is yet a further object to provide memory expansion using a logic-in-memory approach.

An additional object is to provide means for selecting a particular memory configuration responsive to a program instruction.

It is a further object to provide a reconfigurable memory system wherein the various modules thereof may be relabeled with respect to the configuration.

An additional object is to provide means responsive to a program instruction for memory selection, the means further responsive to and operable with DMA devices.

Yet another object is to provide means for enabling a particular memory module, within a configuration of a plurality of such modules, responsive to recognition of a code indicating the block and page number identifying the module.

Additional objects will become apparent to those of ordinary skill in the art upon reading the specification in conjunction with the drawings, wherein like numbers refer to like elements throughout the views.

BRIEF DESCRIPTION OF THE FIGURES

FIG. 1 shows a typical memory paging system,

FIG. 2 illustrates the present invention as applied to a memory module within the system of FIG. 1.

FIG. 5 is a particular circuit representing the address decoder of FIG. 4.

DETAILED DESCRIPTION OF THE PREFERRED EMBODIMENT

Figure 3:
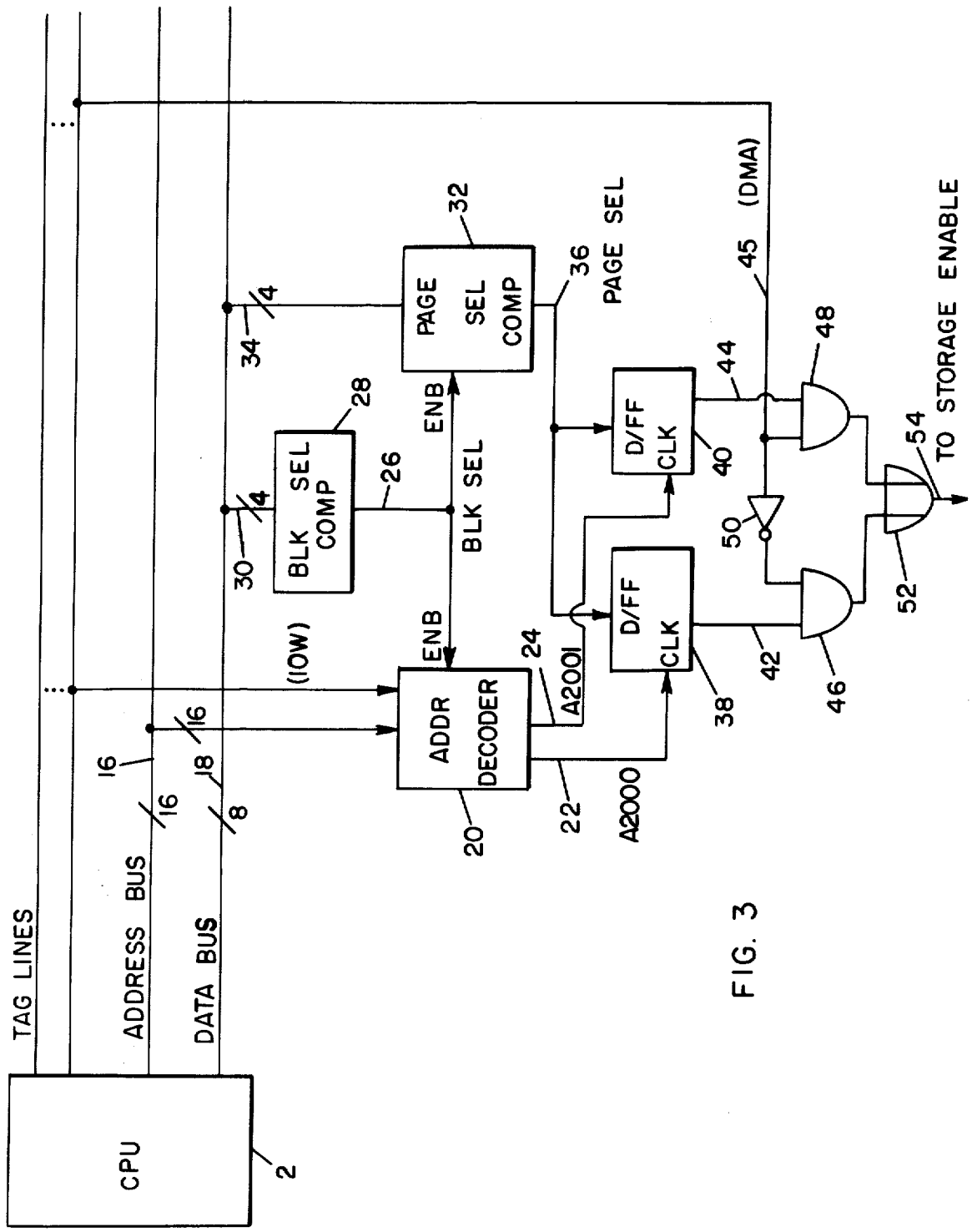
FIG. 3 is a more detailed illustration of the interrelation between the CPU of FIG. 1 and the logic of FIG. 2.

FIG. 1 discloses a typical memory organization system, wherein a CPU 2 is connected, via a common bus 4 to a plurality of memory modules 6. Additionally, a plurality of I/O devices 8 are connected to the bus 4. In ordinary operation, the paging system illustrated by the distribution of the memory modules in the figure provides for additional memory facility for a computing system in excess of the number of storage locations ordinarily addressable by an instruction. The present invention provides, in association with each memory unit 6, a logic section 10 as shown in FIG. 2. The purpose of the logic portion 10 is to provide an enabling signal 12 to permit selection of particular addresses in storage section 14 of memory modules 6. Logic 10 may be physically part of memory 6, along with storage 14, or it may be located elsewhere but associated with a particular module. Actual location is discussed hereafter as "on" the module, but for illustrative purposes only and not as a limitation of the invention as described in the claims.

FIG. 3 shows the basic system in greater detail. Specifically, CPU 2 is shown as connected to bus system 4, which comprises an address bus 16, having 16 bits thereon, and a data bus 18, having eight bits thereon. Additionally, the bus system comprises several taglines for performance of several control functions. The taglines include specific lines indicating that an IO write instruction is being performed, as well as that a DMA device is requesting the bus. The IO write, or IOW instruction, is described in the sequel. The logic section 10 comprises an Address Decoder 20, receiving address data from bus 16, as well as from the tagline for indicating that an IOW instruction is being performed. The decoder 20 is found on each memory unit 6. Equivalently, logic 10 (hence decoder 20) is either associated with, or found on, each of the 16 pages utilized in a particular block. The decoder provides an output on Address 2000 or Address 2001 lines 22 and 24, respectively, responsive to an address of 2000 or 2001 on address bus 16. The decoder is enabled by line 26 from Block Select Comparator 28 in each of 16 pages for a particular block. Clearly, one block select comparator may be associated with each block of 16 memory pages, and may be connected to each of the 16 memory modules. Similar considerations apply to decoder 20. Operation of the comparator is responsive to four of the data lines, carrying a block identification code, on data bus 18. When the specific block is selected, and indicated by the code on the four lines 30, comparator 28 outputs an enabling signal on line 26 to decoder 20. Inasmuch as each page of a particular block has the same block identification number, the decoder 20 for each of the 16 pages in a particular block will provide an output signal on line 22 or 24, depending on whether the contents of address bus 16 included the number 2000 or 2001. Block select comparator 28 additionally provides the enable signal 26 to Page Select Comparator 32, which also receives four lines, shown at 34, from data bus 18, carrying page selection information. The four lines 30 and four lines 34 are different lines found on bus 18. Comparator 32 provides a signal at 36 indicative of the specific page selected for addressing. The page select signal 36 is input to D-type flip-flops 38 and 40, along with the output signals 22 and 24 from decoder 20. As will be appreciated by those skilled in the art, other types of flip-flops, or of latching means, may be used. A specific one of flip-flops 38 or 40 is accordingly triggered for a memory unit representing a particular page and in a particular block responsive to the activation state of signals 22 or 24. That is, if address 2000 were detected, flip-flop 38 would be activated thereby, while if address 2001 were detected, flip-flop 40 would be activated. The selected flip-flop would be switched to provide a high output signal on one of lines 42 or 44 if the page select signal 36 were high. As previously discussed, output signal 36 would be in a high state if and only if both the Block Select Comparator 28 detects the address for the particular block in which the memory unit resides, and if Page Select Comparator 32 detects that the page address within the particular block corresponds to that of the particular memory unit. The corresponding flip-flop, 38 or 40, therefore provides an output on line 42 or 44 depending upon which of the address lines 2000 or 2001 is active, which is indicative of whether the CPU is setting up a storage selection for itself or for a DMA device.

One of the taglines provided by the bus, which may be provided by the DMA device or by the CPU, labeled as the DMA Active line 45, is input to two selecting AND gates shown at 46 and 48. The AND gates receive either the DMA active line, or an inverted form thereof. Inverter 50 may be used to invert the DMA signal to provide the input to AND gate 46. One of the two AND gates will accordingly provide a high signal if the particular block and particular page have been selected, corresponding to the effective address of the page having the memory unit therein, and assuming that the appropriate DMA signal is provided along with the 2000 and 2001 address signals.

The advantage of utilizing address decoder 20 to provide outputs 22 and 24 responsive to the particular address (2000 or 2001) indicative of whether the storage is to be used by the CPU or in a DMA mode is described below. It is to be noted that once a particular page has been selected in a block, an output of a particular flip-flop, 38 or 40, depending on whether the CPU or DMA device is utilizing the storage, remains high. Assuming that the CPU mode is chosen, and that output line 42 is high on the selection of the specific page, gate 46 will provide an output thereby enabling the page via gate 52 only when the DMA active signal is down. On the assumption that it is subsequently decided to provide a separate page within the same block for use by a DMA device, the raising of the DMA signal will disable gate 46, but not flip-flop 38. Accordingly, output 42 remains high. A subsequent choice of a separate page for the DMA storage operations would provide line 44 associated with that page to be high. Accordingly, line 42 for one page in a block may be high and line 44 may be high for a second page within that same block. As the DMA active signal switches between its high and low states, the particular pages involved would accordingly be selected and deselected alternately, the remaining pages in the block remaining unaffected. Thus, the CPU may operate with one memory map, while the DMA devices may operate with another, and the change between the maps may be accomplished without execution of separate IOW instructions, rather merely by the change from the DMA to the non-DMA states.

Figure 4:
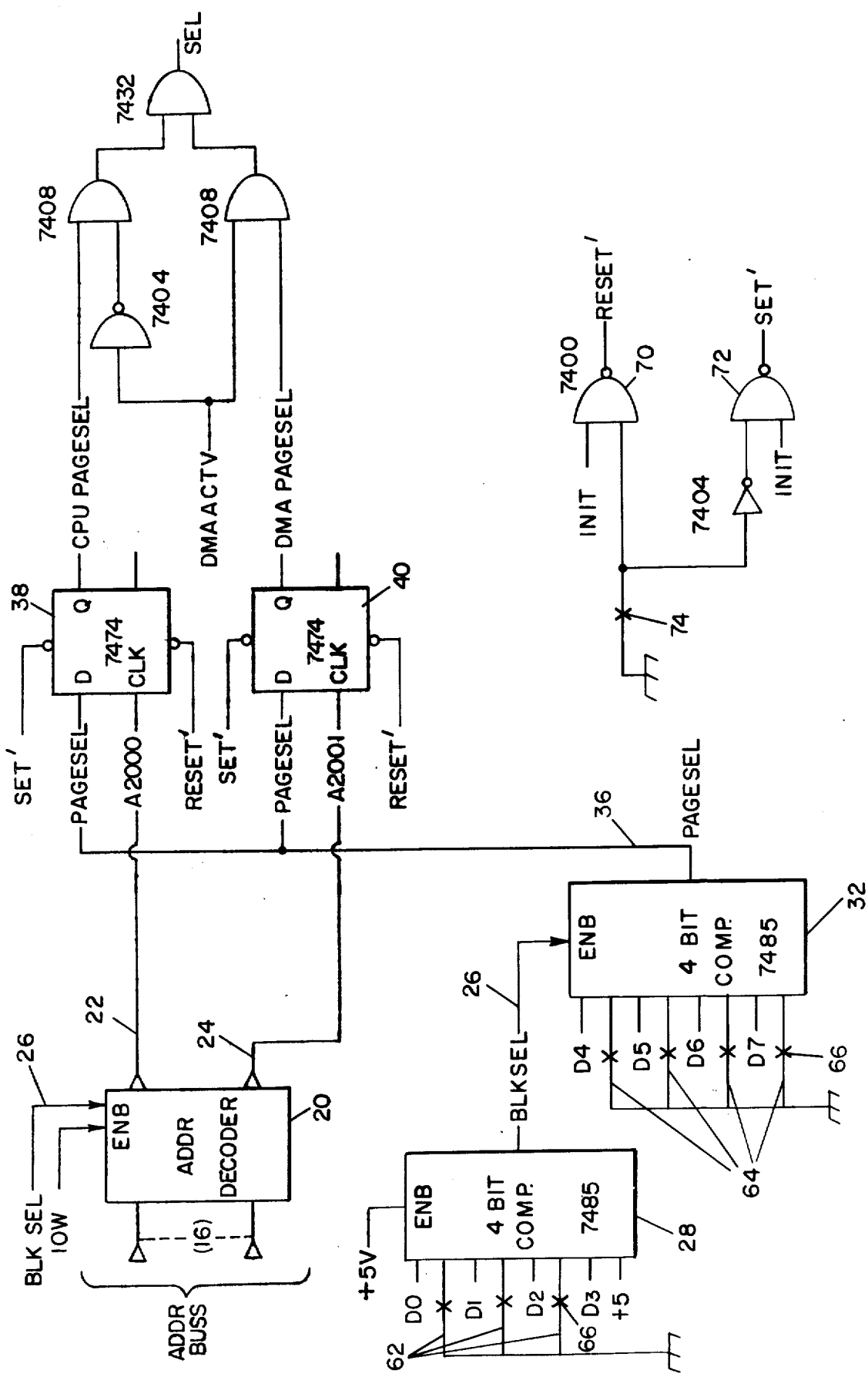
FIG. 4 is a more detailed diagram representing the logic of FIG. 2.

FIG. 4 shows the specific components utilized in FIG. 3, specifically showing the address decoder 20 receiving as input signals, block select enable and IOW, as well as the 16 input signals from the address bus. Two output signals are shown as signals A2000 and A2001. A particular embodiment of the address decoder is shown in FIG. 5, wherein the 15 inverted forms of the address signals $A_1$–$A_{15}$, as well as the block select and IOW signals are provided to an AND gate. Address line A13, the only uninverted signal, accordingly provides an output signal from AND gate 56 in the event that it is high and all the remaining signals are low. Additionally, it is required that Block Select and IOW signals be high. The output of gate 56 is subsequently provided to AND gates 58 and 60, to provide the outputs indicative of the address being 2000 or 2001. Specifically, the first address line, A0, is provided as input to gate 58, while the inverted form of A0 is provided to gate 60. Accordingly, if address lines A0 and A13 are high, indicative of address 2001 being selected, gate 58 provides a high output, while if address line 13 is high, and no other address line is high, the output of gate 60 is high, indicative of address 2000.

Returning to FIG. 4, comparators 28 and 32 are shown as receiving input lines D0 through D3 and D4 through D7, respectively, from data bus 18. The particular lines are compared with the inputs on switched lines 62 and 64. Switches 66 are provided on the logic portion of each memory unit, and may be opened or closed, as desired, to provide any desired page and block code descriptive of the address of a particular memory unit.

Flip-flops 38 and 40 are shown in the figure as receiving inputs from the Page Select Comparator and the Address Decoder, as well as inverted Set and inverted Reset signals generated by gates 70 and 72, responsive to an Initialize signal provided by the system when it is being started or restarted. Accordingly, an inverted Set or inverted Reset signal is output from gate 70 or 72 responsive to the setting of switch 74, indicative of whether or not the particular memory unit comprises the page to which default occurs when the system is initialized. In the event that the unit indeed comprises this default page, the initializing signal accordingly provides a setting or resetting of flip-flops 38 and 40, in compliance with an objective of the invention to provide for the activation of this page for each block on such initialization of a system. The components utilized in FIG. 4 are available from Texas Instruments, Dallas, Texas, for example, under the following designations: Flip-Flops 38, 40—SN 7474; Inverters, e.g., 50—SN 7404; NAND Gates 70, 72—7400; AND Gates, e.g., 46, 48—SN 7408; OR gates, e.g., 52—SN 7432; comparators 28, 32—SN 7485.

A computing system may use any number of blocks and pages. In one particular system eight blocks are used and the number of pages may be zero to sixteen. At any given time, one page in each block is selected and the remaining pages deselected. The particular page selected in any one block is independent of the page selection for any other block. A map of page usage may thus be provided for any particular task, and changed for a different task.

In operation, page selection is achieved by using a specific instruction, the IO Write, or IOW instruction. This instruction has an eight bit data field in the present embodiment, but may clearly have other formats as known to those skilled in the art. For the eight block system, three bits 0–2 for example, are used to identify the block being addressed. Four bits are used to identify the selected page number, and one bit need not be used and has been chosen to be fixed, at a one (high) level. The fixed bit is arbitrarily chosen to be bit 3. These bits comprise the data field.

In an instruction scheme using the function code, an address field and a data field, and where the addresses 2000 and 2001 (hexadecimal) have been chosen for the specific uses hereinabove described, a selection of page 3 of block 5 under control of the CPU is accomplished by execution of the instruction:

IOW, $2000_{16}$, $3D_{16}$.

To set up storage for DMA, the instruction would be

IOW, $2001_{16}$, $3D_{16}$.

Once the instruction is "executed," the desired page is selected, and succeeding instructions need not specify a page number. A flip-flop keeps the chosen page selected until the next execution of an IOW for that same block.

The preceding description is provided by way of illustration and not limitation of the invention. Various modifications thereof will occur to those skilled in the art, and such modifications are within the scope of the appended claims.

We claim:

1. Apparatus for programmably mapping a paged memory of a computing system having central processing means, plural memory means, at least one block of memory, at least one of said at least one block comprising at least two of said memory means, and bus means connecting said central processing means to said plural memory means,
   the apparatus comprising:
   (a) first logic means providing a first output signal responsive to a memory mapping instruction for selecting a first of said at least two of said memory means in a first of said at least one block of memory, and including means
   for defining a first logic state wherein said first memory means is selected when a location in said first block of memory is addressed, and
   (b) second logic means connected to said first memory means and responding to said logic means for maintaining said first logic state until a different program instruction selects a second of said at least two of said memory means, and
   for providing access to the first of said at least two memory means of said first block free of a requirement for address decoding among said at least two memory means whenever said first block is addressed during maintenance of said first state.

2. Apparatus as recited in claim 1 comprising at least two blocks of memory, further comprising
   decoding means responsive to address signals on said bus means for providing a first block select signal whenever said first of said blocks of memory is being addressed,
   wherein said second logic means provides access to said first memory means further responsive to said first block select signal until said different program instruction selects said second of said at least two memory means.

3. Apparatus as recited in claim 2 further comprising input-output (IO) devices connected to said bus means, said devices having, means for accessing said plural memory means, and
   means responsive to a program instruction for defining a second logic state wherein one of at least two memory means is selected whenever said central processing means accesses said first block of memory, and
   for defining a third logic state wherein another of said at least two memory means is selected whenever one of said IO devices accesses said first block of memory, until a program instruction selects other memory means for access in either of said second or said third logic states.

4. Apparatus as recited in claim 3 wherein said one and said another of said at least two memory means are the same memory means.

5. Apparatus as recited in claim 3 wherein said IO devices access said plural memory means in a direct memory access mode, and comprising
   logic means responsive to said central processing means for enabling access to said memory means by said IO devices in said direct memory access mode.

6. Apparatus as recited in claim 5 wherein each of said plural memory means is mounted on a separate module along with the logic means associated therewith.

7. Apparatus as recited in claim 1 wherein each of said plural memory means is on a separate module, and is associated with a separate one of each of said first and second logic means.

8. Apparatus as recited in claim 7 wherein each of said plural memory means is mounted with the first and second means associated therewith on said separate module.

9. Apparatus for programmably mapping a paged memory of a computing system having a central processing means, a plurality of blocks of memory each comprising a plurality of pages of memory, and connecting means connecting said central processing means and said blocks of memory for transferring information therebetween,
   the apparatus comprising storage enabling means associated with each of said plurality of pages of memory comprising:
   (a) bistable means generating a first signal for enabling access to a first page within a first block of memory responsive to information transmitted by said central processing means on said connecting means in executing a first program instruction selecting said first page in said first block of memory, and generating a second signal when another page is to be selected in said first block of memory by a second program instruction executed by said central processing means,
   said bistable means continuing to generate said first signal responsive to said first program instruction even after cessation of transmission of said information by said central processing means until transmission of information by said central processing means responsive to execution of said second program instruction, and continuing to generate said second signal responsive to said second program instruction until transmission of information by said central processing means responsive to execution of another such first program instruction, (b) page select comparing means for responding to said information transmitted by said central processing means representative of execution of said first and second program instructions by generating a page select signal to cause said bistable means to generate said first signal responsive to said first program instruction and said second signal responsive to said second program instruction, (c) each block of memory further comprising a block select comparing means, the block select comparing means associated with one of said blocks responding to further information transmitted by said central processing means selecting said one of said blocks of memory by generating a block select signal to enable each page select comparing means associated with the pages of said one block whereby a memory map accessing specific pages in specific blocks of memory is established and wherein repeated access of specific pages occurs free of a requirement for repeated address decoding among the plurality of pages within the blocks of memory.

10. Apparatus as recited in claim 9 further comprising switching means associated with each of said blocks and pages for setting identifying signals thereon for use by said page select and block select comparing means in conjunction with said information and said further information, respectively, to generate said page select and block select signals, respectively.

11. Apparatus as recited in claim 9 wherein said computing system further has separate means connected to said connecting means and wherein said apparatus further comprises means enabling operation in a first or a second communication mode, and mode selecting means associated with said plurality of pages of memory for enabling selection of a particular page for either or both communication modes and for selection of separate pages in one block for operation in said first and second modes, comprising:

(a) decoding means responsive to mode information transmitted by said central processing means, (b) a plurality of said bistable means corresponding to said communication modes associated with each of said pages of memory, and (c) gating means for said page enabling signals generated by said plurality of said bistable means responsive to a separate signal generated by said separate means requesting operation in one of said modes of operation, whereby a particular page may be selected for a first mode by said central processing means generating a first mode signal in executing a first program mapping instruction, thus triggering a first of said plurality of bistable devices, and by said separate means requesting operation in said first mode.

12. Apparatus as recited in claim 11 wherein said separate means comprises input-output devices, and said two modes of communication comprise a mode for communication between said central processing means and said pages of memory modules, and another mode for direct memory access by said input-output devices.

* * * * *